United States Patent
Takahashi et al.

[11] 3,878,682
[45] Apr. 22, 1975

[54] OIL-HYDRAULIC SERVO-MOTOR

[75] Inventors: Noriyuki Takahashi, Tokyo; Hidehiko Inoue, Ooimachi; Yoshihiko Toshimitsu, Tokyo, all of Japan

[73] Assignee: Honda Giken Kogyo Kabushiki Kaisha, Tokyo, Japan

[22] Filed: June 11, 1973

[21] Appl. No.: 368,681

[52] U.S. Cl. .................. 60/547; 91/434; 91/391
[51] Int. Cl. ............................................ F15b 7/00
[58] Field of Search ........ 60/547, 552, 547; 91/370, 91/391 R, 434, 433, 469, 491 R; 137/625.68, 625.69

[56] References Cited
UNITED STATES PATENTS

| | | | |
|---|---|---|---|
| 3,074,383 | 1/1963 | Schultz | 91/434 |
| 3,298,177 | 1/1967 | Kellogg | 91/434 |
| 3,473,566 | 10/1969 | Peppel | 137/625.69 |
| 3,526,089 | 9/1970 | Fulmer | 91/434 |
| 3,714,869 | 2/1973 | Flory et al. | 91/434 |
| 3,751,919 | 8/1973 | Ron | 91/391 R |

*Primary Examiner*—Martin P. Schwadron
*Assistant Examiner*—Harold Burks, Sr.
*Attorney, Agent, or Firm*—Waters, Roditi, Schwartz and Nissen

[57] ABSTRACT

A servo-motor designed to produce an output force proportional to the input as from a brake pedal, enabling the operator to control the output with ease and accuracy by himself feeling the reaction thereto. The servo-motor can operate the master piston effectively even in case of failure of the oil feed line under direct control of the operator, making it particularly suitable for use with an automotive brake system. Resilient connection with the brake pedal ensures light and smooth pedal operation and comfortable drive.

5 Claims, 2 Drawing Figures

OIL-HYDRAULIC SERVO-MOTOR

BACKGROUND AND SUMMARY OF THE INVENTION

This invention relates generally to oil-hydraulic servo-motors and more particularly to those of the type usable with an automotive brake system and relatively simple in structure.

An object of the present invention is to provide an oil-hydraulic servo-motor which is capable of exerting on the piston in an associated master cylinder an oil pressure force at all times proportional to the input, for example, given through the brake pedal on an automobile and which enables the operator or driver to feel the reaction from the brake system and control the brake action with ease and accuracy.

Another object of the present invention is to provide an oil-hydraulic servo-motor of the character described which is particularly adapted for use with an automotive brake system and capable of producing an output drive of the same magnitude as the force of pedal input for operation of the brake system even in the event of lack of oil feed to the servo-motor.

A further object of the present invention is to provide an oil-hydraulic servo-motor of the character described which is designed to alleviate mechanical shock due to impact of high pressure oil inflow thereby to enable the driver to operate the brake pedal smoothly.

BRIEF DESCRIPTION OF THE DRAWINGS

The present invention will next be described in detail with reference to the accompanying drawings, which illustrate preferred embodiments of the present invention and in which.

DESCRIPTION OF THE PREFERRED EMBODIMENTS

Figure 1:
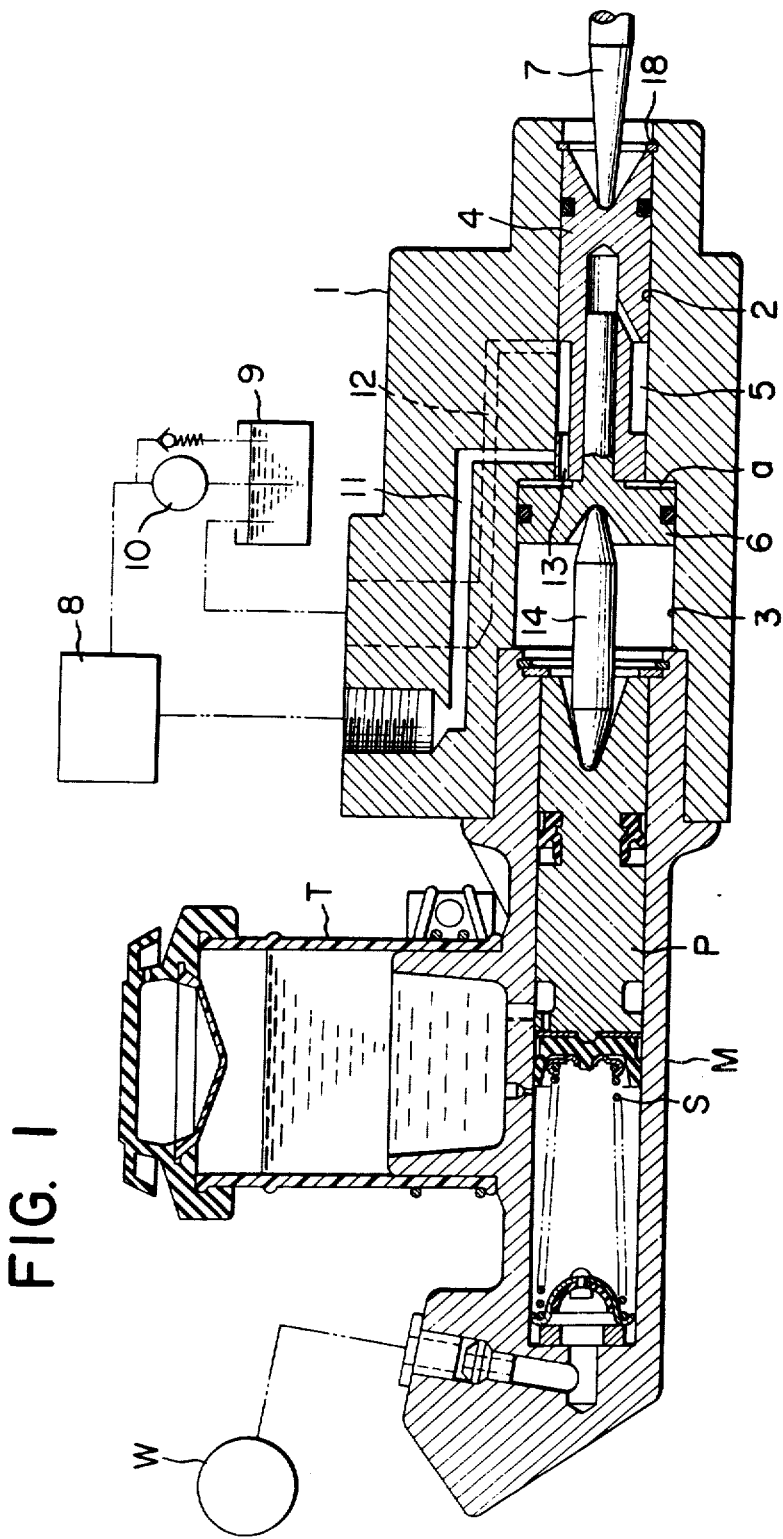
FIG. 1 is a partly schematic axial vertical cross section of one embodiment of the invention as applied to an automotive brake system.

Referring first to FIG. 1, reference numeral 1 designates a casing of the servo-motor embodying the present invention, the casing being rigidly secured, as shown, to the rear end portion of a master cylinder M, which forms part of the automotive brake system and is itself well known in the art.

The servo-motor casing 1 is formed therein with a cylindrical bore consisting of an outer reduced diameter portion 2, the remaining inner portion 3 having a larger diameter. Slidably fitted in the reduced diameter bore portion 2 is a control valve member or piston 4 having an annular oil passage 5 peripherally formed intermediate the ends thereof. The control valve member 4 is operatively associated at the outer end with a brake operating rod 7, which in turn is associated with a brake pedal or like operating member, not shown. The casing 1 is formed in its wall surrounding the cylindrical bore 2-3 with a high pressure oil passage 11, which communicates with a pressure accumulator 8 connected to an oil pressure pump 10, and a low pressure oil passage 12 communicating with an oil reservoir 9. As shown, these oil passages 11 and 12 are directed to open at the opposite end into the reduced diameter bore portion 2 and in operation are opened and closed by axial sliding movement of the control valve member 4, as will be described later in detail.

A drive piston 6 is slidably fitted in the larger diameter portion 3 of the cylindrical bore formed in the casing 1 and, in co-operation with the control valve member 4, defines an oil chamber or space $a$ in the bore portion 3. The control valve member 4 is also formed with an axially extending passage or port 13 which connects the oil chamber $a$ with the annular oil passage 5 formed in the control valve member 4. In this manner, the oil pressure receiving surfaces of the drive piston 6 on one side of the oil chamber $a$ is held opposite to the adjacent end face of the control valve member 4, which naturally has an area smaller than the oil receiving area of the drive piston 6.

the drive piston 6 is operably connected with the main piston P, slidably fitted in the master cylinder M, through the intermediary of a connecting rod 14 so that any axially inward movement of drive piston 6 is transmitted to the main piston P by way of the connecting rod 14.

In this figure, reference character T designates an oil reservoir provided to feed the master cylinder M with working oil; S designates a coil spring arranged in the master cylinder M to bias the main piston P to its normal inoperative position; and W designates a wheel cylinder held in communication with the master cylinder M to be supplied with a braking oil pressure therefrom.

Description will now be made of the operation of the servo-motor of the present invention. When the driver steps on the brake pedal to apply the brake, the brake operating rod 7 is displaced, under the pedal action, to move the control valve member 4 leftward, as viewed in FIG. 1, initially closing the low pressure oil passage 12 while keeping the high pressure oil passage 11 closed. As the brake pedal is driven further, the high pressure oil passage 11 is opened or placed into communication with the annular oil passage 5 so that the high pressure oil from the accumulator 8 is allowed to flow into the annular oil passage 5 and thence through the axial port 13 into the oil chamber $a$ and thus acts upon the pressure receiving end surface of the drive piston 6 and upon the adjacent end face of the control valve member 4. As a result, the drive piston 6 having a larger pressure receiving area than the control valve member 4 is moved leftward apart from the latter to drive the main piston P through the intermediary of the connecting rod 14, while at the same time the end face of the control valve member 4 exposed to the oil space $a$ is subjected to the reactive oil pressure force as a brake reaction.

Subsequently, when the actuating force on the brake pedal is reduced and the force of hydraulic drive upon piston 6 is exceeded by the restoring force of biasing spring S normally acting upon the main piston P, the drive piston 6 and control valve member 4 are both moved back by the main piston P now being restored. In moving backward, the control valve member 4 first closes the high pressure oil passage 11 and subsequently places the low pressure oil passage 12 into communication with the annular oil passage 5 and through axial port 13 with the oil chamber $a$ to allow the pressure oil previously fed therein to flow into the oil reservoir 9, and the servo-motor is restored to its inoperative state. Reference numeral 18 indicates a stop means provided to limit backward movement of the control valve member 4.

Figure 2:
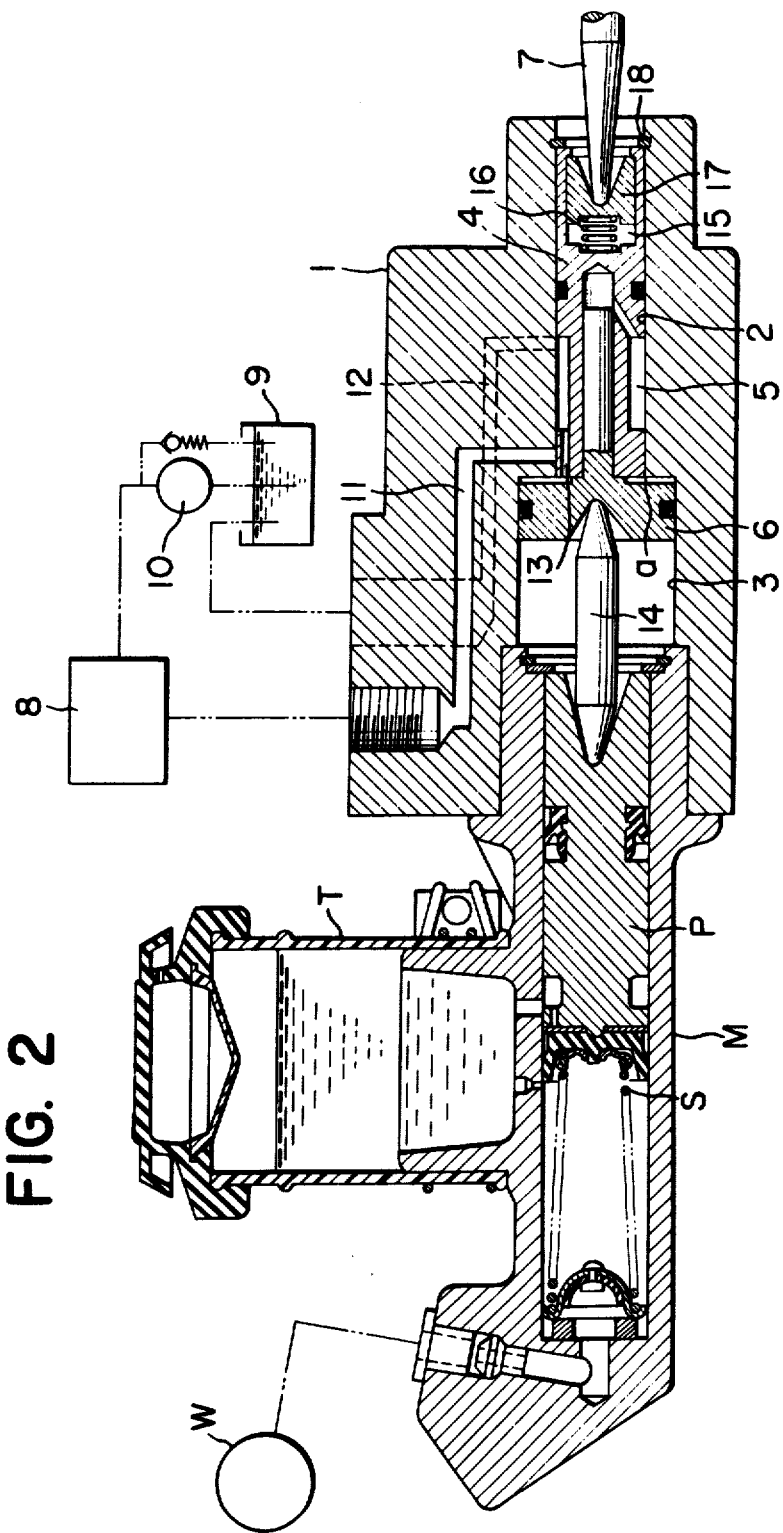
FIG. 2 is a view similar to FIG. 1, illustrating another embodiment of the invention.

FIG. 2 illustrates a modification of the servo-motor shown in FIG. 1, and the same reference characters have been used as in FIG. 1 for similar parts.

As will readily be observed, this modified form of servo-motor is of basically the same construction but is designed to minimize the pressure oil shock to the operator with the intention of enabling him to operate the brake pedal or other operating member smoothly.

To attain this objective, the control valve member or piston 4 in this instance is provided at its outer end with a cylindrical bore or cavity 15, in which a bearing element 17 is slidably fitted. A coil spring or equivalent cushioning member 16 is arranged between the bottom wall of the cavity 15 and the bearing element 17 to bias the latter outwardly into bearing engagement with the adjacent end of brake operatinng rod 7, which is operatively associated with the brake pedal, not shown.

In operation, at the instant when the control valve member 4 being advanced reaches an axial position to place the annular oil passage 5 in communication with the high pressure oil passage 11, which is formed in the wall of casing 1, high pressure oil is admitted into the annular oil passage 5 and strikes, among others, against the right-hand side wall of the annular oil passage 5 which faces axially inwardly of the valve member 4, thus giving a more or less shock to the latter. Such oil shock to the brake operating rod 7 is effectively alleviated by the resilient connection between the control valve member 4 and the brake operating rod 7, which includes coil spring 16 and bearing element 17 slidable relative to the control valve member 4. In other words, the oil shock imparted to the control valve member 4 can be substantially taken up by the coil spring 16, and the driver can operate the brake pedal smoothly.

It will be appreciated from the foregoing that, according to the present invention, the main piston P in the master cylinder M can at all times be subjected to an oil pressure force directly proportional to the force applied to the brake pedal and, accordingly, the driver can increase or decrease the brake force as desired. Moreover, the reaction to the brake force is exactly transmitted through the brake operating rod 7 to the brake pedal and felt by the operator, enabling him to control the brake force with ease and accuracy.

In further accordance with the present invention, the brake system can be operated effectively even if the servo-mechanism is unworkable with some failure in the oil feed line including pump 10 and resulting lack of oil pressure build-up in the oil chamber a, since in this case the pedal force acting on the brake operating rod 7 can be transmitted directly to the main piston P in the master cylinder M through the control valve member 4 and drive piston 6. This is highly desirable for reliable brake operation and driving safety.

In addition, according to the present invention, any substantial shock of pressure oil on the brake operating rod can be effectively eliminated for light and smooth brake pedal operation and comfortable drive.

While the principles of the invention have been described herein in connection with two specific embodiments as applied to an automotive brake system, it is to be clearly understood that this description is made only by way of example and not as a limitation to the scope of the invention as set forth in the objects thereof and in the annexed claims.

What is claimed is:

1. An oil-hydraulic servo-motor for a control system such as an automotive brake system, comprising a casing having a stepped cylindrical bore with an outer reduced diameter portion and an inner enlarged diameter portion, a master cylinder having one end mounted in said casing, a main piston slidably mounted in said master cylinder for driving the control system, a control valve member operatively associated with an externally operated rod and slidably fitted in said reduced diameter portion of said cylindrical bore, said control valve member having an annular oil passage in the periphery thereof, a drive piston operatively coupled with said main piston and slidably fitted in said inner enlarged diameter portion of the cylindrical bore, said drive piston defining an oil pressure chamber in said cylindrical bore in cooperation with said control valve member, and being in abutment in its rearmost position with the forward end of said control valve member, said oil pressure chamber being at all times in communication with said annular oil passage, and high and low pressure oil passages both extending through the wall of said casing and opening into said reduced diameter portion at axially spaced locations from one another such that said annular passage may be placed into communication with the low pressure passage and disconnected from the high pressure passage when said control valve member assumes an outer normal position in said reduced diameter portion, said annular passage being in communication with the high pressure passage and disconnected from the low pressure passage when said control valve member assumes an inner operative position in said reduced diameter portion.

2. A servo-motor as claimed in claim 1 wherein said control valve member includes a land portion bounding said annular passage on the side thereof closest to said drive piston, said land portion having a port providing the constant communication between said annular oil passage and said oil pressure chamber.

3. A servo-motor as claimed in claim 2 wherein said land portion blocks said high pressure passageway in said normal position of the control valve member.

4. A servo-motor as claimed in claim 3 wherein said control valve member includes a second land portion bounding the annular passage on the side thereof remote from said drive piston, said second land portion blocking the low pressure passageway in the inner operative position of the control valve member.

5. A servo-motor as claimed in claim 1 wherein said control valve member is provided with an axial bore, and comprising a bearing element slidably fitted in said axial bore and operably associated with the external operating rod, and a cushioning member arranged in said axial bore between the bottom wall thereof and said bearing element.

* * * * *